(12) United States Patent
Shudo

(10) Patent No.: US 8,036,920 B2
(45) Date of Patent: Oct. 11, 2011

(54) INFORMATION PROCESSOR, INFORMATION PROCESSING METHOD, AND COMPUTER READABLE MEDIUM

(75) Inventor: Hiroaki Shudo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 443 days.

(21) Appl. No.: 12/238,102

(22) Filed: Sep. 25, 2008

(65) Prior Publication Data

US 2009/0237488 A1    Sep. 24, 2009

(30) Foreign Application Priority Data

Mar. 19, 2008  (JP) ................. 2008-071917

(51) Int. Cl.
*G06Q 10/00* (2006.01)
*G06Q 50/00* (2006.01)
(52) U.S. Cl. .............................. 705/5; 705/6
(58) Field of Classification Search ............ 705/5, 6
See application file for complete search history.

(56) References Cited

U.S. PATENT DOCUMENTS

2006/0045253 A1 * 3/2006 Bieselin et al. ......... 379/202.01

FOREIGN PATENT DOCUMENTS

| JP | A-2001-051956 | 2/2001 |
|---|---|---|
| JP | A-2003-6370 | 1/2003 |
| JP | A-2004-220177 | 8/2004 |
| JP | A-2005-071146 | 3/2005 |
| JP | A-2005-222478 | 8/2005 |
| JP | A-2006-293858 | 10/2006 |
| JP | A-2007-140934 | 6/2007 |

OTHER PUBLICATIONS

Mondaq Business Briefing, "Reporting Requirements Under the Labor-Management Reporting and Disclosure Act of 1959; Reports of Gifts to Union Officials." Jan. 5, 2006.*
Office Action issued on Nov. 17, 2009 in Japanese Patent Application No. 2008-071917 (with translation).

* cited by examiner

*Primary Examiner* — John Hayes
*Assistant Examiner* — Allen Jung
(74) *Attorney, Agent, or Firm* — Oliff & Berridge, PLC

(57) ABSTRACT

An information processor includes: a receiving unit that receives a place of a conference and a feature of a participant who is to participate in the conference; a person extracting unit that extracts persons corresponding to the feature of the participant received by the receiving unit; a cost calculating unit that calculates a cost necessary for the persons extracted by the person extracting unit to participate in the conference on the basis of the place of the conference received by the receiving unit; and a participant selecting unit that selects the participants who are to participate in the conference among the persons extracted by the person extracting unit on the basis of a choice reference in accordance with the cost calculated by the cost calculating unit.

4 Claims, 10 Drawing Sheets

INFORMATION PROCESSOR, INFORMATION PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-071917 filed Mar. 19, 2008.

BACKGROUND

1. Technical Field The present invention relates to an information processor, an information processing method, and a computer readable medium.

2. Related Art

When a conference is held, participants who are at least acquainted with are ordinarily previously determined and the participants are informed about the determination. However, when a knowledgeable person necessary for the conference is not previously known or a better knowledgeable person is desired to be obtained, the knowledgeable person needs to be searched.

SUMMARY

According to an aspect of the present invention, an information processor includes: a receiving unit that receives a place of a conference and a feature of a participant who is to participate in the conference; a person extracting unit that extracts persons corresponding to the feature of the participant received by the receiving unit; a cost calculating unit that calculates a cost necessary for the persons extracted by the person extracting unit to participate in the conference on the basis of the place of the conference received by the receiving unit; and a participant selecting unit that selects the participants who are to participate in the conference among the persons extracted by the person extracting unit on the basis of a choice reference in accordance with the cost calculated by the cost calculating unit.

BRIEF DESCRIPTION OF THE DRAWINGS

Exemplary embodiment of the present invention will be described in detail based on the following figures, wherein.

DETAILED DESCRIPTION

Figure 1:
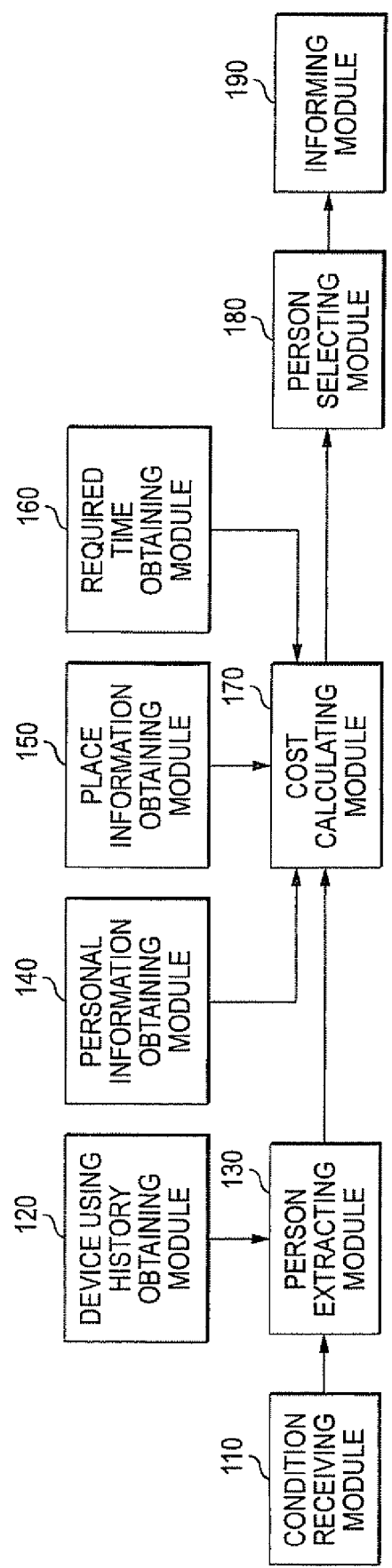
FIG. 1 is a conceptual module block diagram of a structural example of an embodiment.

Now, referring to the drawings, various kinds of preferred embodiments for realizing the present invention will be described below.

(Basic Form)

FIG. 1 shows a conceptual module block diagram of a basic (this is not a meaning of necessity, but simply a meaning of capability to be used for sharing) structural example of various kinds of embodiments. First to fourth embodiments are realized on the module structural example shown in FIG. 1.

A module ordinarily indicates logically separable parts of software (computer program), hardware or the like. Accordingly, the module in this embodiment indicates not only the module in the computer program, but also the module in a hardware structure. Therefore, this embodiment also explains the computer program, a system and a method. In this case, for the convenience of explanation, "store", "allow to store" and words equivalent to them are used. When this embodiment is the computer program, these words indicate a meaning to allow a storage device to store or to control the storage device to store. Further, the module substantially corresponds to a function on a one-to-one basis. However, in a mounting, one module may be formed with one program, or a plurality of modules may be formed with one program. On the contrary, the one module may be formed with a plurality of programs. Further, the plurality of modules may be executed by one computer or one module may be executed by a plurality of computers in a distributed or parallel environment. Other modules may be included in the one module. A "connection" includes a logical connection (a transmission and reception of data, an instruction, a reference relation between data or the like) as well as a physical connection, hereinafter.

Further, a system or a device includes not only a structure obtained by connecting a plurality of computers, hardware, devices etc. by a communication unit such as a network (including a communication connection on a one-to-one basis) but also a structure realized by one computer, hardware, a device or the like. The "device" and the "system" are used as words having the same meaning. Further, a word of prescribed includes not only a meaning of predetermined, but also a meaning of depending on a status and a state at that time or a meaning of depending on a status and a state up to that time.

This embodiment is used when knowledgeable persons necessary for a conference are searched to set persons whose costs of participating in the conference are low as participants under the conditions of information for specifying the persons as the knowledgeable persons and costs required from the places of ordinary activities of the persons to the place of the conference. The conference includes a presentation, a lecture and an inquiry carried out by facing the persons in the form of an interview as well as a discussion carried out by a plurality of gathering persons. Further, the knowledgeable person is a participant who is to participate in the conference and is not necessarily conscious of having a knowledge required for the conference and corresponds to, for instance, a person who has an experience necessary for the subject of the conference. Further, the cost is generated as expenses for the conference, and includes, for instance, personnel expenses=a required time×a unit cost (here, for instance, as the required time, a moving time+a time of conference is exemplified, and, as the unit cost, the unit cost of one participant per hour is exemplified), traffic expenses for a movement, etc. The cost may not be necessarily directly expressed by money, and may include, for instance, a time required for moving to a conference room, an amount of use of resources of a computer or the like.

The person is referred to as a user, a participant or the like depending on the context of the explanation.

The basic form of this embodiment includes, as shown in FIG. 1, a condition receiving module 110, a device using history obtaining module 120, a person extracting module 130, a personal information obtaining module 140, a place information obtaining module 150, a required time obtaining module 160, a cost calculating module 170, a person selecting module 180 and an informing module 190.

The condition receiving module 110 is connected to the person extracting module 130, receives the place of the conference and the feature of the participant who is to participate in the conference in accordance with an operation of a person who sets the conference in a side that looks for the persons and delivers the place of the conference and the feature of the participant to the person extracting module 130. Further, the condition receiving module 110 may receive the date of the conference and deliver the date of the conference to the person extracting module 130.

The person extracting module 130 is connected to the condition receiving module 110, the device using history obtaining module 120 and the cost calculating module 170 to extract a person corresponding to the feature of the participant received by the condition receiving module 110. At that time, the person may be extracted by employing the device using history obtaining module 120. For instance, a device using history is obtained from the device using history obtaining module 120 to extract a person corresponding to the feature of the person desired to be searched. The person extracting module 130 delivers information related to the extracted person to the cost calculating module 170.

Further, the person extracting module 130 carries out a user extracting process for extracting a user corresponding to the feature of the participant received by the condition receiving module 110 from users stored in the device using history obtaining module 120. When the person extracting module 130 cannot extract the user, the person extracting module 130 may repeatedly carry out the user extracting process after a prescribed time. Here, "after the prescribed time" includes after a predetermined constant time, a time at which a using history in the device using history obtaining module 120 is updated or the like. The user extracting process is repeated until the date on which the conference is to be finally determined (the latest date on which the participants are notified).

The device using history obtaining module 120 is connected to the person extracting module 130 to obtain the using history from a device, stores the using history so as to be coordinated with the user of the device and delivers the device using history corresponding to a request from the person extracting module 130 to the person extracting module 130.

The cost calculating module 170 is connected to the person extracting module 130, the personal information obtaining module 140, the place information obtaining module 150, the required time obtaining module 160 and the person selecting module 180 to calculate a cost for the person extracted by the person extracting module 130 to participate in the conference on the basis of the place of the conference received by the condition receiving module 110. More specifically, the cost is calculated for the person extracted by the person extracting module 130 to move from the place of activity of the person to the place of the conference received by the condition receiving module 110. Then, the cost calculating module 170 delivers the calculated cost to the person selecting module 180.

Further, when the conference through a communication can be realized in the place of the conference received by the condition receiving module 110, the cost calculating module 170 may compare a required time to another place where the conference through the communication can be realized with a required time to the place of the conference received by the condition receiving module 110 to calculate the cost in accordance with either of the required times. That is, when a remote conference device can be used in the place of the conference, a nearest place where a remote conference can be realized is determined as a place where the extracted person participates in the conference.

Further, the cost calculating module 170 may decide whether or not the person extracted by the person extracting module 130 can participate in the conference on the basis of a schedule extracted by the personal information obtaining module 140 and the date of the conference received by the condition receiving module 110. Then, the cost calculating module 170 may calculate the cost of the person decided to be able to participate in the conference.

The personal information obtaining module 140 is connected to the cost calculating module 170 to obtain information related to the person (for instance, the name, an ordinary place of activity, etc.), stores the information and delivers the personal information corresponding to a request from the cost calculating module 170 to the cost calculating module 170. Further, the personal information obtaining module 140 may extract the schedule of the person extracted by the person extracting module 130.

The place information obtaining module 150 is connected to the cost calculating module 170 to obtain information related to the place (for instance, a position of a conference room in a building, whether or not the remote conference device is present, etc.), stores the information and delivers place information corresponding to a request from the cost calculating module 170 to the cost calculating module 170.

The required time obtaining module 160 is connected to the cost calculating module 170 to obtain information related to a required time for a movement from a certain place to a certain place (for instance, from the place of activity of a person to the conference room), stores the information and delivers the information related to the required time corresponding to a request from the cost calculating module 170 to the cost calculating module 170.

The person selecting module 180 is connected to the cost calculating module 170 and the informing module 190 to select the participants who are to participate in the conference from the persons extracted by the person extracting module 130 in accordance with a choice reference on the basis of the cost calculated by the cost calculating module 170. As the choice reference of the participants of the conference, for instance, a prescribed budget is set in the conference. Namely, the persons are selected so as to be located within a range of the budget. Further, as the choice reference, for instance, is exemplified the number of persons (the number of the participants composed of the persons satisfying the feature) who are to participate in the conference. When the number of the participants is set to one, the person whose cost is the lowest is selected as an optimum participant. The number of the persons to be selected may be one or a plurality of numbers. The person selecting module 180 delivers information related to the selected participants to the informing module 190.

The informing module 190 is connected to the person selecting module 180 to inform the participants selected by the person selecting module 180 of a participation in the conference. For instance, the informing module 190 transmits electronic mails of a guide for holding the conference.

First Embodiment

A first embodiment is an example obtained when the cost is calculated only by the required time for a movement by using the above-described basic form.

Figure 2:
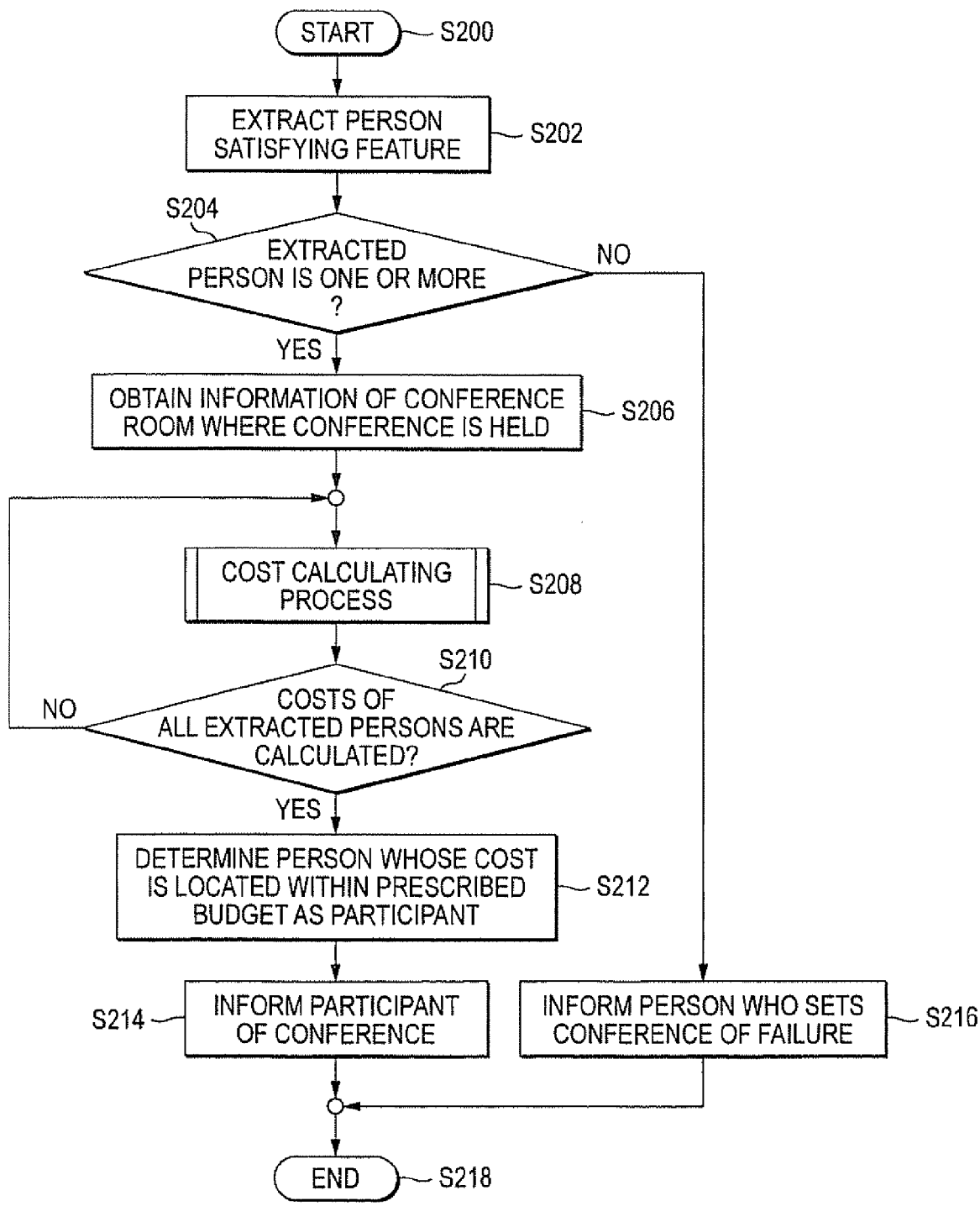
FIG. 2 is a flowchart showing a process example according to a first embodiment.
Figure 4:
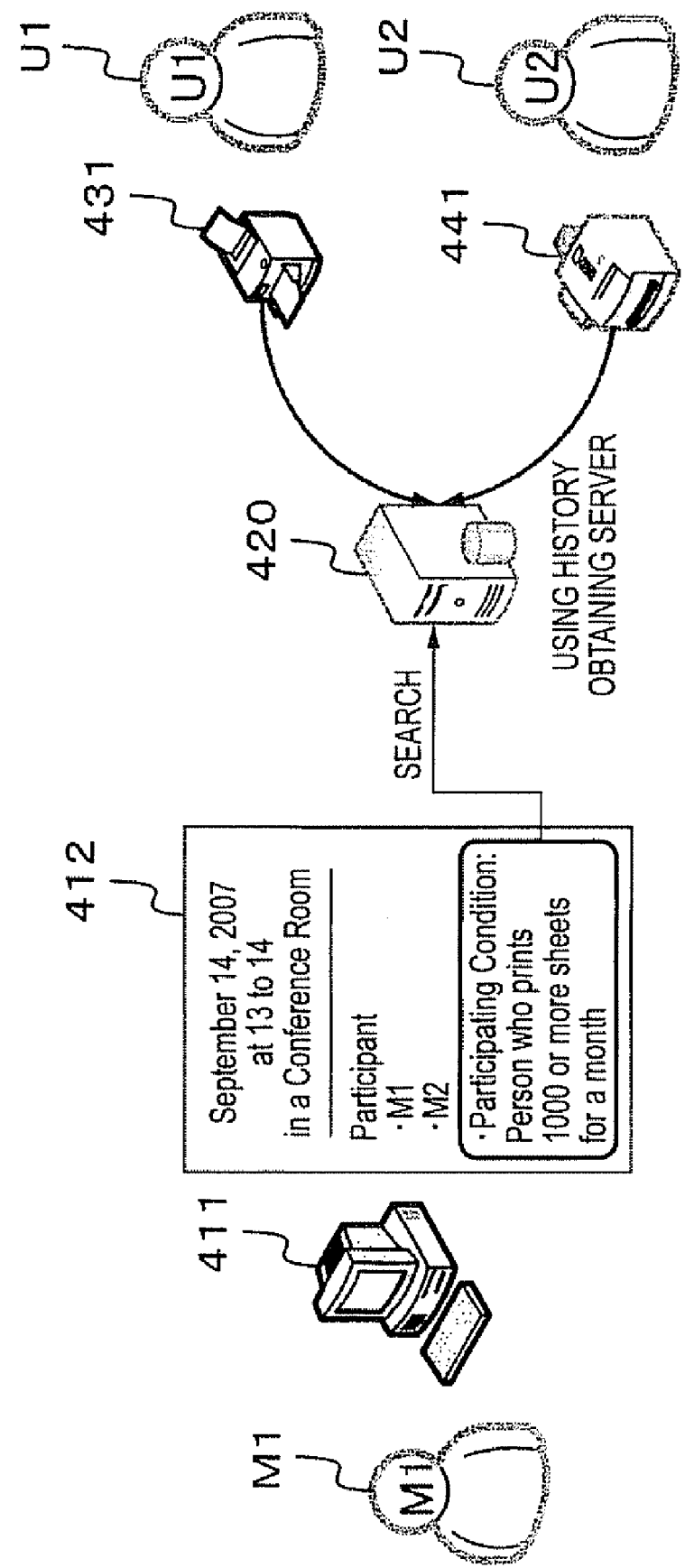
FIG. 4 is an explanatory view showing an extracting process example of an object user.

FIG. 2 is a flowchart showing a process example according to the first embodiment. This process example is explained by using a specific example shown in FIG. 4. FIG. 4 is an explanatory view showing an extracting process example of an object user.

Initially, the condition receiving module 110 receives conference condition information 412 including the date of the conference, the place (the conference room, the building having the conference room, an address or the like), the participants and the feature of the person who is to participate in the conference in accordance with an operation to a personal computer 411 by a user Ml as a person who sets the conference. For instance, as the "feature of the person who is to participate in the conference", is exemplified a "person who prints 1000 or more sheets for a month", etc.

In step S202, the person extracting module 130 extracts the person satisfying the feature of the person who is to participate in the conference in the received conference condition information 412.

A printer 431 and a printer 441 respectively store the using histories of the devices so as to be coordinated with users U1 and U2 as the users. The device using history obtaining module 120 in a using history obtaining server 420 obtains the using histories of the devices from the printers 431 and 441. Then, the person extracting module 130 requests the device using history obtaining module 120 to search a condition of "the person who prints 1000 or more sheets for a month".

Instep S204, the person extracting module 130 decides whether or not the person extracted in the step S202 is one or more. In this decision, when the person is one or more (YES), the process advances to step S206, otherwise (NO, when there is not a person satisfying the feature), the step advances to step S216.

In the step S206, the cost calculating module 170 obtains information of the conference room where the conference is held by considering the conference room received by the condition receiving module 110 to be a key by the use of the place information obtaining module 150. Here, as the information of the conference room, for instance, are exemplified, the name of the building having the conference room, the presence/absence of the remote conference device or the like.

In step S208, the cost calculating module 170 calculates the cost of the person for participating in the conference on the basis of the information of the conference room obtained in the step S206 for each person extracted in the step S202. A calculating process of the cost will be described below by using a flowchart shown in FIG. 3.

In step S210, the cost calculating module 170 decides whether or not the costs of all the persons extracted in the step S202 are calculated in the step S208. In this decision, when the costs of all the persons are calculated (YES), the process advances to step S212, otherwise (NO), the process returns to the step S208.

In the step S212, the person selecting module 180 selects the participants who are to participate in the conference from the persons extracted in the step S202 in accordance with the costs calculated in the step S208 so as to be located within a prescribed budget. For instance, the persons are sorted on the basis of the cost, the costs are added in order from the lowest cost to decide whether or not the added costs are located within the prescribed budget for each addition and the persons are selected as the participants until the added costs exceed the prescribed budget.

In step S214, the informing module 190 informs the participants selected in the step S212 of the date of the conference, the place, the participants, etc. in the conference condition information 412 received by the condition receiving module 110 by the electronic mails.

In step S216, the informing module 190 informs the user Ml that there is not a person satisfying the feature.

Figure 3:
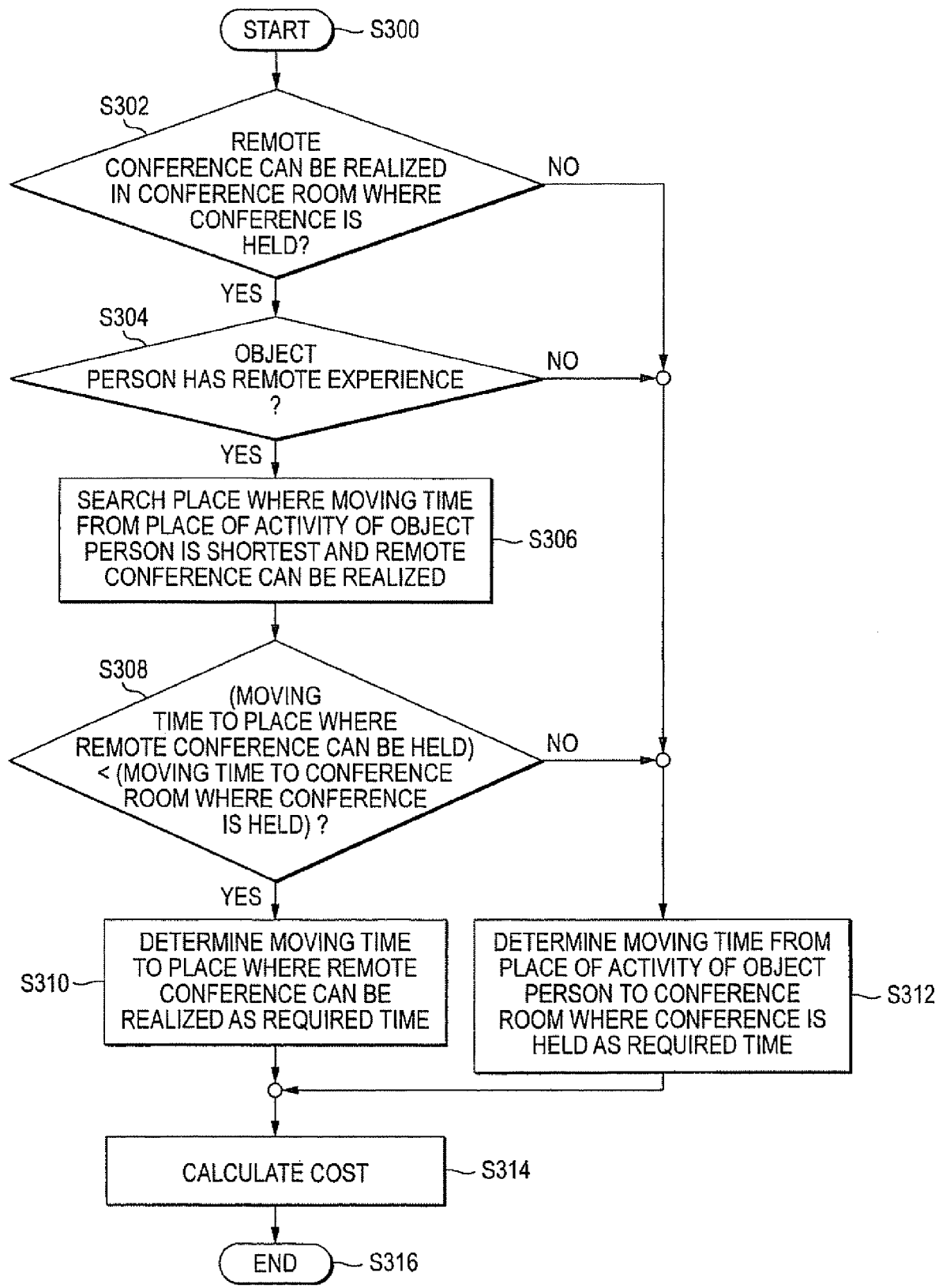
FIG. 3 is a flowchart showing a cost calculating process example according to the first embodiment.
Figure 5:
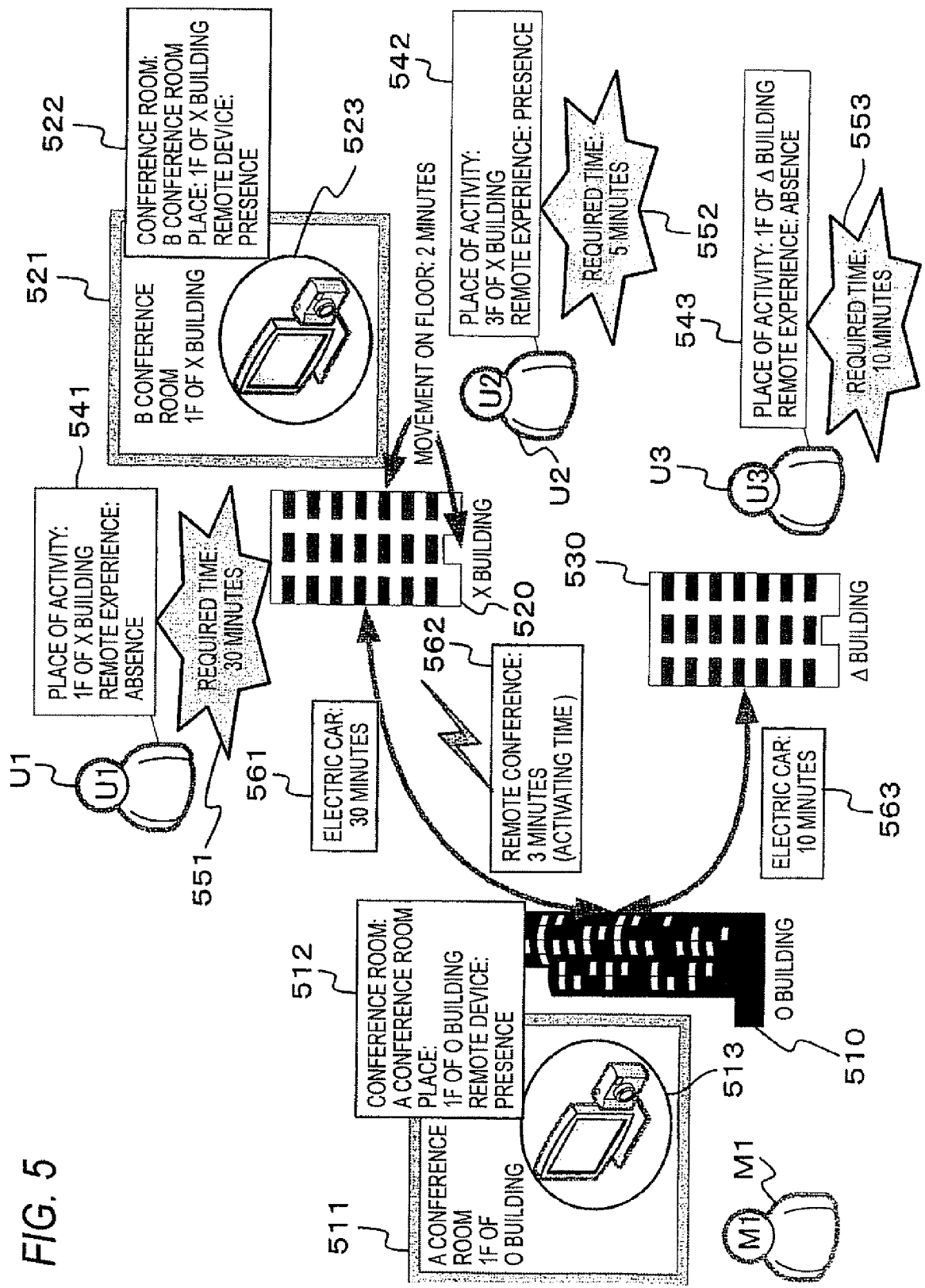
FIG. 5 is an explanatory view showing a calculating process example of a required time for each extracted user to a conference room.

FIG. 3 is a flowchart showing a cost calculating process example (the step S208 carried out by the cost calculating module 170 in the flowchart shown in FIG. 2) according to the first embodiment. The cost calculating process example will be described by using a specific example shown in FIG. 5. FIG. 5 is an explanatory view showing a calculating process example of a required time for each extracted user to move to the conference room. Namely, a user U3 has the shortest time required to move to an A conference room 511, however, by considering the remote conference device, the user U2 can be decided to have the shortest required time. Further, the user U1 is nearer to a B conference room 521 than the user U2, however, since the user U1 does not have a remote experience, the user U1 shows a required time longer than that of the user U2.

In step S302, it is decided whether or not a remote conference can be realized in the conference room where the conference is held by using the place information obtained from the place information obtaining module 150. In this decision, when the remote conference can be realized (YES), the process advances to step S304, otherwise (NO), the process advances to step S312. In describing specifically by referring to FIG. 5, the A conference room 511 has the remote conference device 513 from the place information 512 to decide that the A conference room 511 is a place where the remote conference can be achieved.

In step S304, it is decided whether or not the person as an object has an experience of the remote conference by using the personal information obtained from the personal information obtaining module 140. In this decision, when the person has the experience of the remote conference (YES), the process advances to step S306, otherwise (NO), the process advances to the step S312. In describing specifically by referring to FIG. 5, the extracted persons are the users U1, U2 and U3. When the person as the object is the user U1, the user U1 is decided to have no experience of the remote conference by using the personal information 541. When the object person is the user U2, the user U2 is decided to have the experience of the remote conference by using the personal information 542. When the object person is the user U3, the user U3 is decided to have no experience of the remote conference by using the personal information 543.

In the step S306, by using the personal information obtained from the personal information obtaining module 140, the place information obtained from the place information obtaining module 150 and required time information obtained from the required time obtaining module 160, a place is searched where the shortest time is necessary for the object person to move from the place of activity of the object person and the remote conference can be realized. In describing specifically by referring to FIG. 5, the object person is the user U2, and it is recognized from the personal information 542 that the ordinary place of activity of the user U2 is a 3F of a x building 520. It is further recognized from the place information 522 that the nearest place therefrom where the remote conference can be held is a B conference room 521 and a time necessary for the user U2 to move from the 3F to a 1F in the x building 520 is two minutes. It is further recognized from the required time information 562 that a time required for activating the device of the remote conference is three minutes.

In step S308, it is decided for the object person whether or not "(a time required to move to the place where the remote conference can be held) is smaller than (a time required to move to the conference room where the conference is held)". In this decision, in the case of YES, the process advances to step S310, otherwise, the process advances to step S312. In describing specifically by referring to FIG. 5, the object person is the user U2. In accordance with the step S306, (the time required to move to the place where the remote conference can be held) is five minutes obtained by adding a true moving time of two minutes to the activating time of the remote conference device of three minutes. Since (the time required to move to the conference room where the conference is held) is 30 minutes by an electric car from the required time information 561, the process advances to the step S310.

In the step 310, by using the required time obtaining module 160, the time required to move to the place where the remote conference can be held is set as the required time for the person as the object. In describing specifically by referring to FIG. 5, the object person is the user U2 and (the time required for the user U2 to move to the place where the remote conference can be held) is five minutes obtained by adding the true moving time of two minutes to the activating time of the remote conference device of three minutes.

In the step S312, by using the required time obtaining module 160, the time required to move to the conference room where the conference is held from the place of activity of the person as an object is set as the required time. In describing specifically by referring to FIG. 5, the object persons are the users U1 and U3, and it is recognized from the required time information 561 that the required time information 551 from the 1F of the x building 520 as the ordinary place of activity of the user U1 to a 1F of a O building 510 having the conference room indicates "30 minutes by the electric car". Further, it is recognized from the required time information 563 that the required time information 553 from a 1F of a Δ building 530 as the ordinary place of activity of the user U3 to the 1F of the O building 510 having the conference room indicates "ten minutes by the electric car". Then, the required time of the user U1 is set to 30 minutes from the required time information 551 and the required time of the user U3 is set to 10 minutes from the required time information 553.

In step S314, the product of the unit cost of the object person and the required time (the required time obtained in the step S310 or the step S312) is obtained to calculate the cost.

Figure 6:
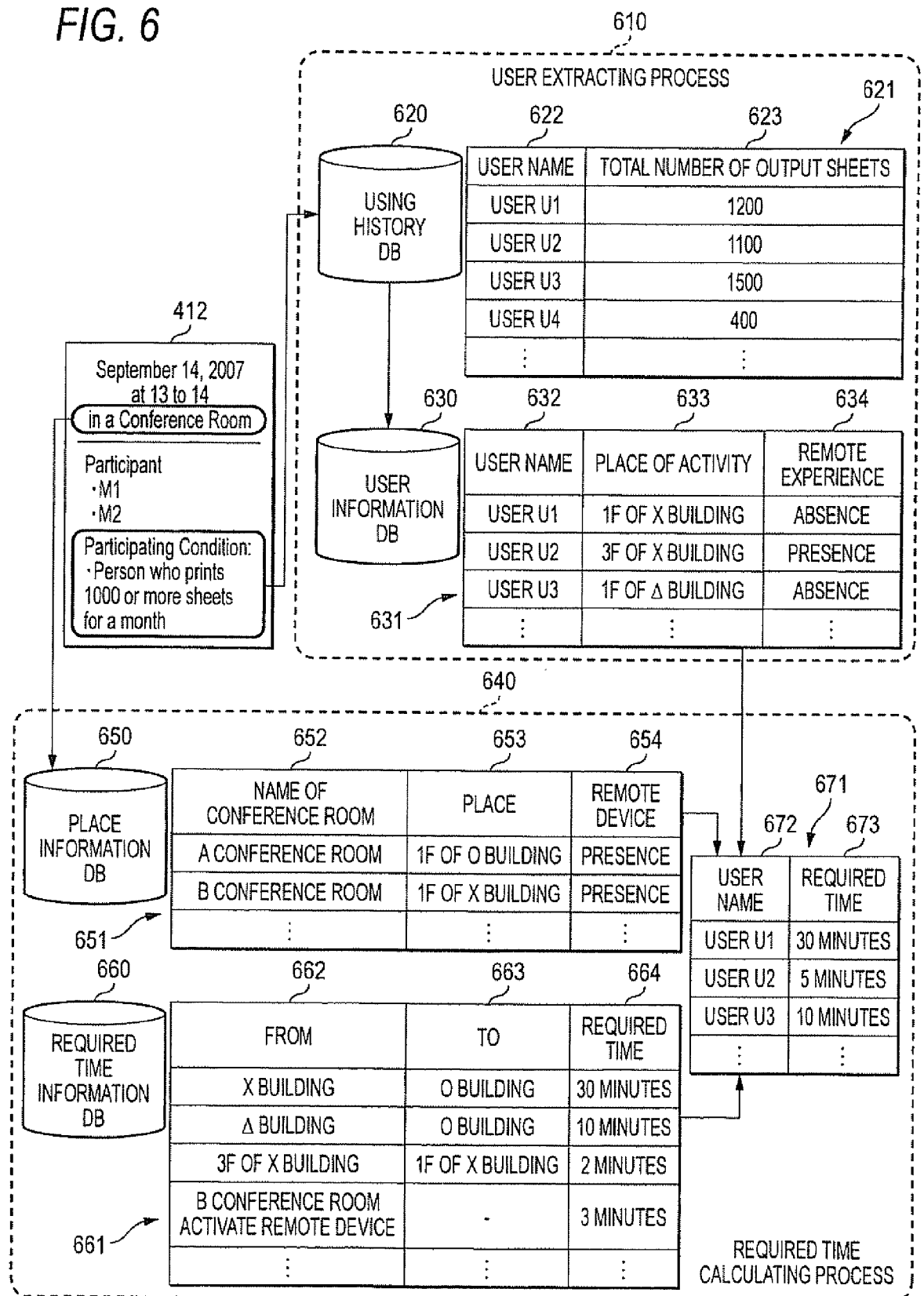
FIG. 6 is an explanatory view showing a related example between data in a user extracting process and a required time calculating process.

FIG. 6 is an explanatory view showing a related example between data in a user extracting process (the step S202) by the person extracting module 130 and the personal information obtaining module 140 and a required time calculating process (the step S310, the step S312) by the cost calculating module 170.

In the user extracting process 610, a using history DB 620 and user information DB 630 are used. In the using history DB 620, a using history table 621 is stored. In the user information DB 630, a personal information table 631 is stored.

The using history table 621 includes a user name column 622 and a total output sheet number column 623.

The personal information table 631 includes a user name column 632, an activity place column 633 and a remote experience column 634.

The using history DB 620 is provided in the device using history obtaining module 120 to store the device using history of each user (here, the total number of output sheets as the number of printed sheets for a month) The device using history obtaining module 120 extracts the persons (the users U1, U2 and U3) satisfying the feature of the person who is to participate in the conference "the person who prints 1000 or more sheets for a month" in the conference condition information 412.

The user information DB 630 is provided in the personal information obtaining module 140 to store the name of each user, the ordinary place of activity and the presence/absence of the experience of the remote conference. The personal information obtaining module 140 obtains the personal information (the ordinary place of activity, the presence/absence of the experience of the remote conference) of the persons (the users U1, U2 and U3) extracted by the device using history obtaining module 120 from the personal information table 631.

In the required time calculating process 640, place information DB 650 and required time information DB 660 are used. In the place information DB 650, a place information table 651 is stored. The place information table 651 includes a conference room name column 652, a place column 653 and a remote device column 654.

The required time information DB 660 stores a required time information table 661.

The required time information table 661 include a From column 662, a To column 663 and a required time column 664.

A required time calculated result table 671 has finally obtained required time information, includes a user name column 672 and a required time column 673 and stores a required time from the ordinary place of activity of each user extracted by the person extracting module 130 to the conference room.

The place information DB 650 is provided in the place information obtaining module 150 to store the name of each conference room, the place thereof and the presence/absence of the remote conference device. The place information obtaining module 150 obtains the place of the conference room and the presence/absence of the remote conference device by using the name of the conference room in the conference condition information 412 as a key from the place information DB 650.

The required time information DB 660 is provided in the required time obtaining module 160 to store a required time when the person moves from a certain place to a certain place. The required time obtaining module 160 obtains the time required to move from the place of activity (for instance, the name of the building) to the place of the conference room (for instance, the name of the building) or the activating time of the remote device from the required time information DB 660.

Then, the cost calculating module 170 obtains the required time as shown in the required time calculated result table 671 for each user extracted by the person extracting module 130. That is, the personal information table 631, the place information table 651 and the required time information table 661 are used to obtain the required time calculated result table 671.

For instance, it is known for the user U1 that the remote conference cannot be carried out from the remote experience column 634 of the personal information table 631, the ordinary place of activity is the x building 520 from the activity place column 633, the conference room where the conference is held is the O building 510 from the place column 653 of the place information table 651 and the required time to move from the x building 520 to the O building 510 is 30 minutes from the required time column 664 of the required time information table 661.

Further, it is known for the user U2 that in the conference room where the conference is held, the remote conference can be achieved from the remote device column 654 of the place information table 651 and the remote conference can be realized from the remote experience column 634 of the personal information table 631, the ordinary place of activity of the user U2 is the 3F of the x building 520 from the activity place column 633 and the conference room having the remote device that is the nearest thereto is a B conference room located in the 1F of the x building 520 from the place information table 651, then, it takes two minutes to move from the 3F to the 1F of the x building 520 from the required time information table 661, the activating time of the remote device is three minutes and the total of the required time for the user U2 to participate in the conference is five minutes.

A moving time in the building (for instance, a movement between floors) and the activating time of the remote device are not managed in a data base and may be considered to be a prescribed time. Further, whether or not the user has the remote experience is not managed by the user information DB 630 and may be decided from the using history of the conference room. Namely, when the user uses the conference room having the remote device in the past, it is decided that the user has the experience of the remote conference.

Second Embodiment

A second embodiment carries out a process associated with a scheduler by using the above-described basic form, and excludes, in a required time calculating process, a person having a schedule on the date (from a start to an end) when a conference is held (see step S704). Further, a place where a user is present immediately before the start time of the conference is decided from the scheduler to correct a place of activity (see step S706). Further, a person is excluded (a person whose moving time cannot be ensured) whose shortest required time is larger than a space time immediately before the start time of the conference. The scheduler is a program in which each person records a schedule and can deliver information showing what time and what day, and where the person is present to a personal information obtaining module 140.

Figure 7:
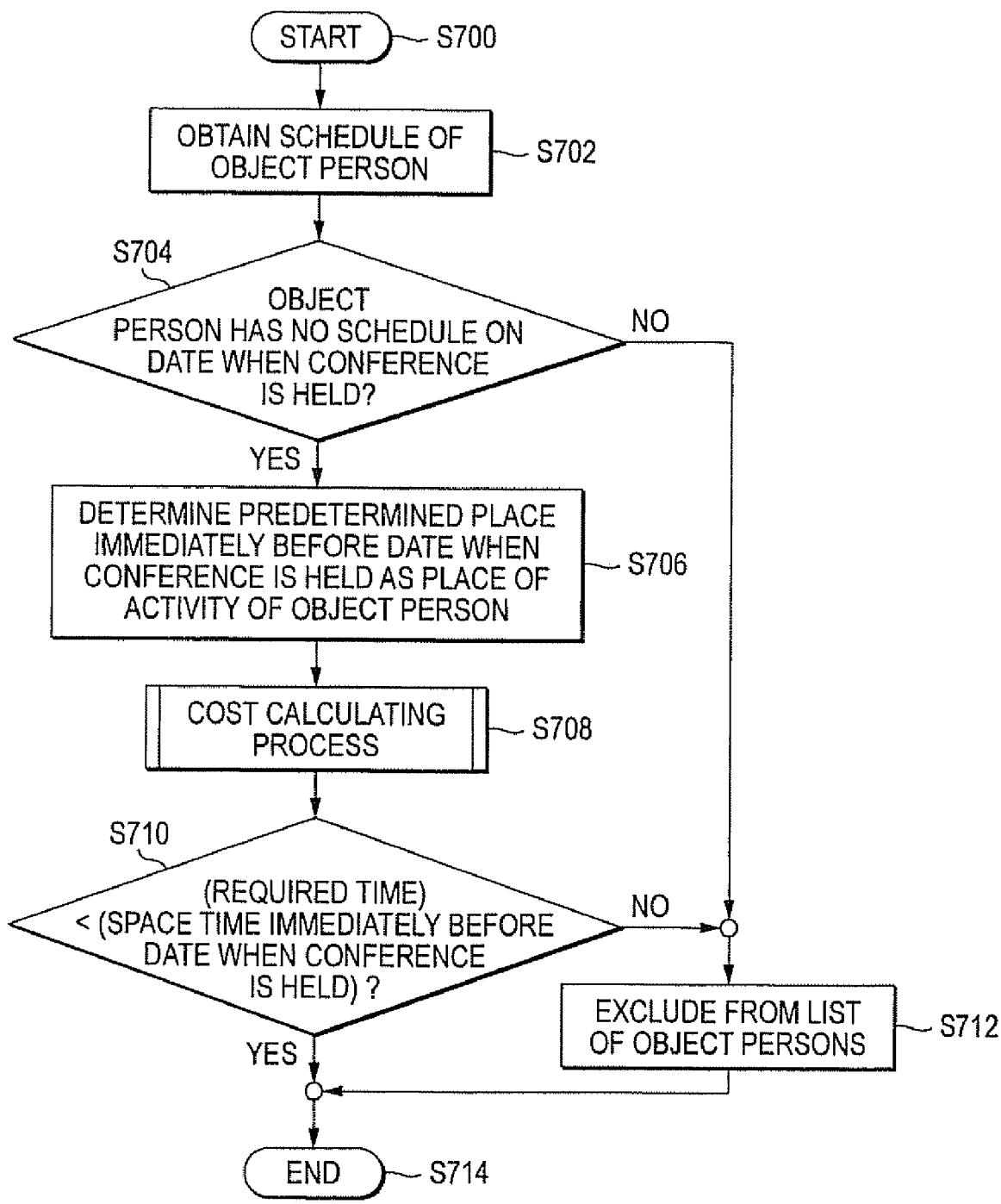
FIG. 7 is a flowchart showing a process example according to a second embodiment.

FIG. 7 is a flowchart showing a process example according to the second embodiment. This flowchart is inserted into the step S208 shown in FIG. 2. That is, an entire process indicates the flowchart shown in FIG. 2 and the cost calculating process of the step S208 in the flowchart shows the flowchart of FIG. 7. Further, step S708 shown in FIG. 7 indicates the flowchart shown in FIG. 3.

In step S702, a cost calculating module 170 requests the personal information obtaining module 140 to obtain the schedule of a person as an object from the scheduler.

In step S704, the cost calculating module 170 decides whether or not the object person has the schedule on the date when the conference is held. In this decision when the person has no schedule (YES), the process advances to step S706. When the person has the schedule (NO), the process advances to step S712.

In the step S706, the cost calculating module 170 determines a predetermined place immediately before the date when the conference is held as the place of activity of the object person. That is, the place of activity is considered to be a place of a start of movement to carry out a process of step S708.

The step S708 shows the flowchart illustrated in FIG. 3.

In step S710, the cost calculating module 170 decides whether or not "(the required time) is smaller than (the space time immediately before the date when the conference is held)". In this decision, in the case of YES, the process is finished (step S714), otherwise, the process advances to the step S712.

In the step S712, the cost calculating module 170 excludes the person decided by the process either in the step S704 or in the step S710 from the list of the object persons. Namely, such a person is excluded from participants of the conference.

Third Embodiment

A third embodiment carries out a process for improving a possibility to find a participant when the participant is not found by using the above-described basic form. Namely, when an object person cannot be extracted by a person extracting module 130, a using history is updated or a search is executed again at intervals of prescribed time (see a repeating process under NO in step S806). Further, when the object person is not found a prescribed time before a conference is started, a person who sets the conference is informed of a failure (see step S802 and step S818). Namely, a case that the using history is updated after the participant is searched once can be also met.

Figure 8:
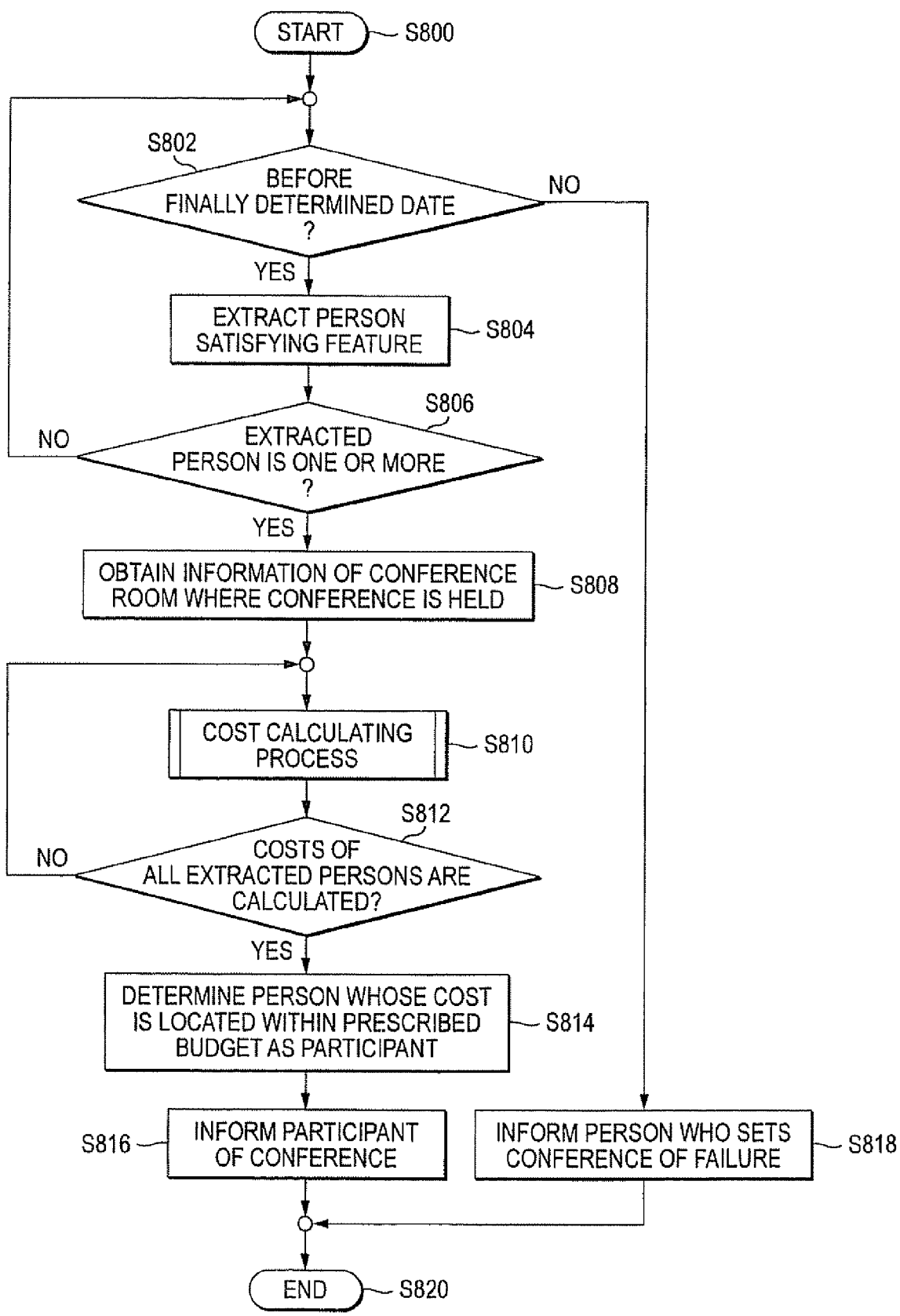
FIG. 8 is a flowchart showing a process example according to a third embodiment.

FIG. 8 is a flowchart showing a process example by the third embodiment.

In the step S802, the person extracting module 130 decides whether or not a present time is a prescribed time before the conference is started. In this decision, in the case of YES, the process advances to step S804. In the case of NO, the process advances to the step S818.

The step S804 is the same process as the process of the step S202 of the flowchart shown in FIG. 2.

In the step S806, the person extracting module 130 decides whether or not the extracted persons are one or more. In this decision, when the extracted persons are one or more (YES), the process advances to step S808, otherwise (NO, when there is not a person satisfying a feature), the process returns to the step S802.

Processes of the step S808 to step S816 are the same as the processes of the step S206 to the step S214 of the flowchart shown in FIG. 2.

In the step S818, an informing module 190 informs the person who sets the conference that there is not a person satisfying the feature.

Fourth Embodiment

A fourth embodiment further adds the number of persons who are to participate in a conference as a choice reference of a person selecting module 180 by using the above-described basic form. Here, a plurality of persons are designated as participants who are to participate in the conference. That is, the plurality of persons may be searched as the participants. When the number of persons is designated, the persons of the designated number are determined in order from the person whose cost is the lowest (or a required time is the shortest) as the object persons.

Figure 9:
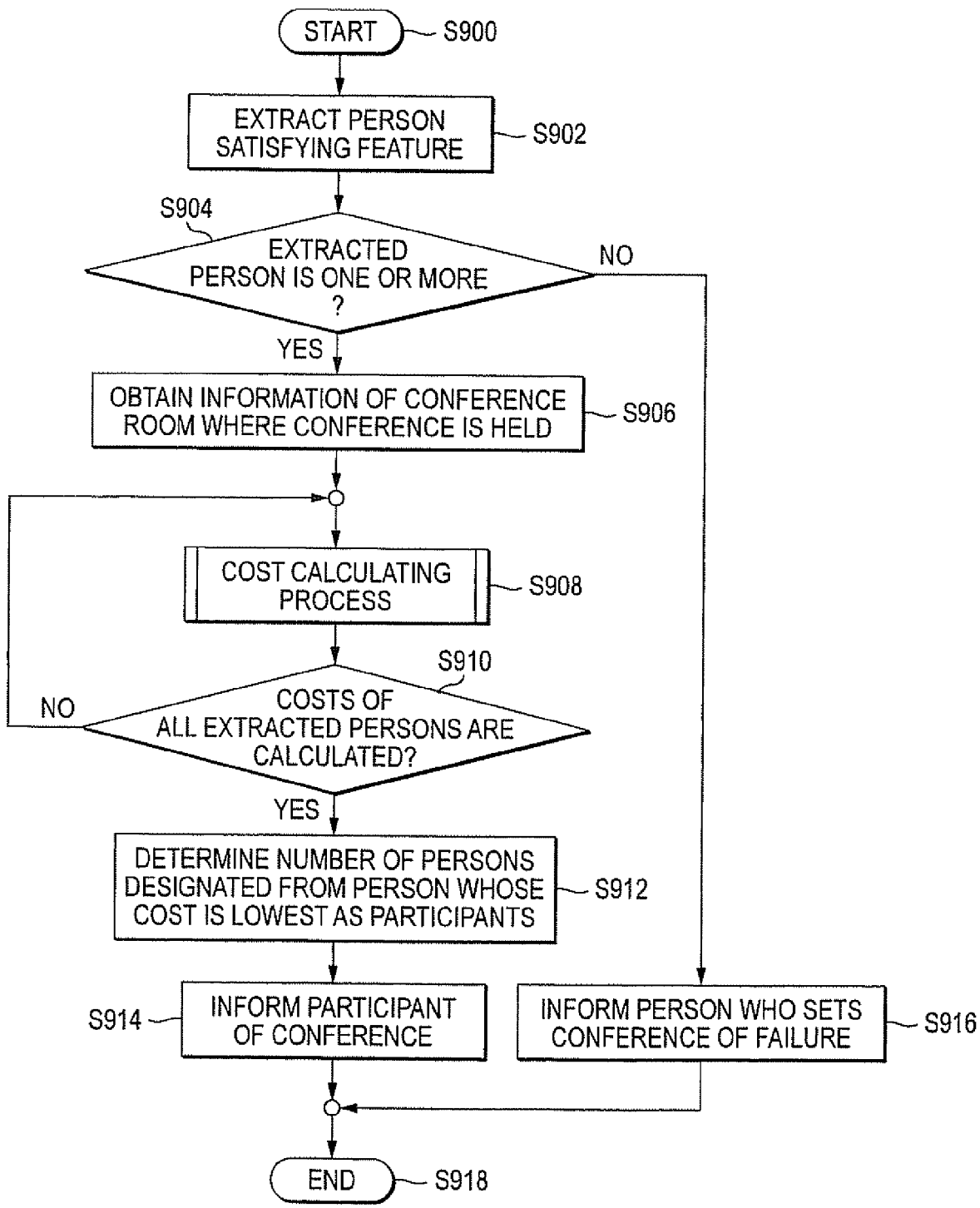
FIG. 9 is a flowchart showing a process example according to a fourth embodiment.

FIG. 9 is a flowchart showing a process example by the fourth embodiment.

Initially, a condition receiving module 110 receives the date of the conference, the place thereof, the participants, the features of the persons who are to participate in the conference and the number of the participants satisfying the features in accordance with an operation of a person who sets the conference.

Processes of step S902 to step S910 are the same as the processes of the step S202 to the step S210 of the flowchart shown in FIG. 2.

In step S912, the person selecting module 180 selects the number of persons designated from the person whose cost calculated in the step S908 is the lowest as the participants on the basis of the choice reference. For instance, the persons are sorted on the basis of the cost, the persons are added in order from the person of the lowest cost to decide whether or not the number of persons reach the designated number of persons or whether or not the added costs are located within a prescribed budget for each addition, and the persons added up to that time are selected as the participants when the number of persons reach the designated number of persons, and the persons whose costs are located within the budget are selected as the participants when the added costs exceed the prescribed budget.

Processes of step S914 and step S916 are the same as the processes of the step S214 and the step S216 of the flowchart shown in FIG. 2.

Figure 10:
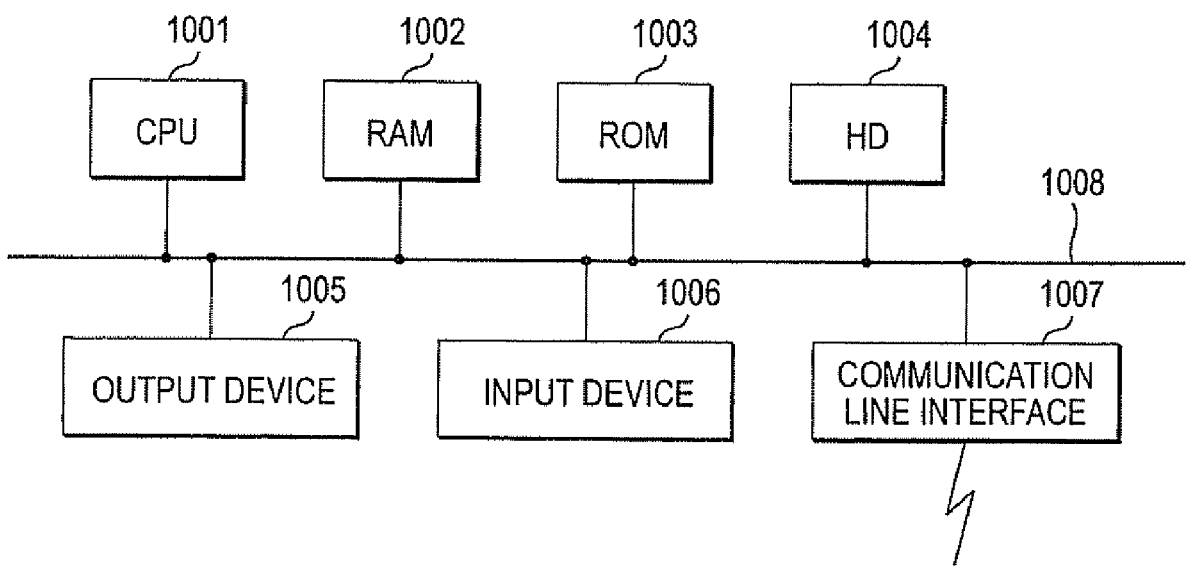
FIG. 10 is a block diagram showing a hardware structural example of a computer for realizing the embodiments.

The hardware structure of the computer on which a program as an embodiment is executed is an ordinary computer as illustrated in FIG. 10, and specifically a computer capable of being a personal computer and a server. The hardware structure of the computer includes a CPU 1001 (in this example, a CPU is used as a computing part) for executing programs of a condition receiving module 110, a device using history obtaining module 120, a person extracting module 130, a personal information obtaining module 140, a place information obtaining module 150 or the like, a RAM 1002 for storing the program or data thereof, a ROM 1003 in which a program for activating the computer is stored, an HD 1004 as an auxiliary storage device (for instance, a hard disk can be used), an input device 1006 for inputting data of a keyboard, a mouse or the like, an output device 1005 such as a CRT or a liquid crystal display, a communication line interface 1007 to be connected to a communication network (for instance, a network interface card can be used) and a bus 1008 for connecting them together to transmit and receive the data. A plurality of the computers may be connected together by the network.

In the embodiment of the above-described embodiments by the computer program, a system of the hardware structure is allowed to read the computer program as software so that the software cooperates with the resources of the hardware to realize the above-described embodiment.

The hardware structure shown in FIG. 10 illustrates one structural example, and the embodiment of the present invention is not limited to the structure shown in FIG. 10. Any structure that can execute the modules described in the embodiments may be used. For instance, a part of the modules may be formed with an exclusive hardware (for instance, ASIC or the like). A part of the modules may be located in an external system and connected by a communication line. Further, a plurality of the systems shown in FIG. 10 may be connected together by the communication line to mutually cooperate. Further, especially, the structure shown in FIG. 10 may be incorporated in an information processing domestic electrical device, a copying machine, a facsimile device, a scanner, a printer, a compound machine (an image processor having two or more functions of the scanner, the printer, the copying machine, the facsimile device, etc.) or the like as well as the personal computer.

The above-described program may be stored and provided in a recording medium. Further, the program may be provided by a communication unit. In this case, for instance, the above-described program may be taken as the invention of a "recording medium having a program recorded that can be read by a computer".

The "recording medium having a program recorded that can be read by a computer" means a recording medium having a program recorded that can be read by a computer, which is employed for installing and executing the program and circulating the program.

As the recording medium, are exemplified, for instance, a digital versatile disk (DVD) such as "DVD-R, DVD-RW, DVD-RAM, etc." as a standard established in a DVD forum; "DVD+R, DVD+RW, etc." as a standard established by a DVD+RW, a compact disk (CD) such as a read only memory (CD-ROM), a CD recordable (CD-R), a CD rewritable (CD-RW), etc., a photo-electro-magnetic disk (MO), a flexible disk (FD), a magnetic tape, a hard disk, a read only memory (ROM), an electrically erasable and rewritable read only memory (EEPROM), a flash memory, a random access memory (RAM), etc.

The above-described program or a part thereof may be recorded and stored in the recording medium and circulated. Further, the program may be transmitted through a communication by using, for instance, a local area network (LAN), a metropolitan area network (MAN), a wide area network (WAN), a wired network or a radio communication network employed for an internet, an intranet, an extra net, and a transmitting medium such as a combination of them, or may be transmitted by a carrier wave.

Further, the above-described program may be a part of other program or stored in a recording medium together with a separate program. Further, the program may be divided into and stored in a plurality of recording media. Further, the program may be recorded in any form when the program may be restored, so that the program may be compressed or encoded.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A system comprising:
   a processor;
   a memory;
   the processor configured to carry out instructions comprising:
   receiving a place of a conference and a feature of a participant who is to participate in the conference;
   extracting persons corresponding to the feature of the participant received by the receiving unit;
   calculating a cost necessary for the persons extracted by the person extracting unit to participate in the conference on the basis of the received place of the conference;

selecting the participants who are to participate in the conference among the persons extracted by the person extracting unit on the basis of a choice reference in accordance with the cost calculated; and storing in a storage device a using history of a device in coordination with users of the device, wherein extracting persons includes extracting users corresponding to the feature of the participant from the step of receiving, among the users stored in the storage device, in a case where the person extracting unit cannot extract the users, carrying out the user extracting process after a prescribed time, in a case where the conference can be held through a communication in the place of the conference received in the receiving step, comparing a first time required for each extracted person to travel to another place where the conference can be held by the communication with a second time required for said each extracted person to travel to the place of the conference received in the receiving step to calculate the cost on the basis of either the first time required or the second time required, and the extracted persons are sorted on the basis of the costs, and the costs of said each extracted person are added in order from a lowest cost to decide whether or not the added costs are within a prescribed budget for said each extracted person added, and the extracted persons are selected as the participants until the added costs exceed the prescribed budget.

2. The system as claimed in claim 1, wherein the instructions further comprising:

receiving a date of the conference, extracting schedules of the persons extracted; and deciding whether or not the persons extracted can participate in the conference on the basis of the schedules extracted and the received date of the conference, and calculating the cost of the persons decided to be able to participate in the conference.

3. An information processing method comprising:

Receiving a place of a conference and a feature of a participant who is to participate in the conference;

extracting persons corresponding to the received feature of the participant;

calculating, by the processor, a cost necessary for the extracted persons to participate in the conference on the basis of the received place of the conference;

selecting, by the processor, the participants who are to participate in the conference among the extracted persons on the basis of a choice reference in accordance with the calculated cost; and storing in a storage device a using history of a device in coordination with users of the device, wherein extracting persons includes extracting users corresponding to the feature of the participant in the step of receiving among the users stored in the storage device, in a case where the step of extracting persons cannot extract the users, carrying out the user extracting process aider a prescribed time, in a case where the conference can be held through a communication in the place of the conference received in the receiving step, comparing a first time required for each extracted person to travel to another place where the conference can be held by the communication with a second time required for said each extracted person to travel to the place of the conference received in the receiving step to calculate the cost on the basis of either the first time required or the second time required, and the extracted persons are sorted on the basis of the costs, and the costs of said each extracted person are added in order from a lowest cost to decide whether or not the added costs are within a prescribed budget for said each extracted person added, and the extracted persons are selected as the participants until the added costs exceed the prescribed budget.

4. A non-transitory computer readable medium storing a program causing a computer to execute a process for performing an information processing, the process comprising:

receiving a place of a conference and a feature of a participant who is to participate in the conference;

extracting persons corresponding to the received feature of the participant;

calculating a cost necessary for the extracted persons to participate in the conference on the basis of the received place of the conference; and selecting the participants who are to participate in the conference among the extracted persons on the basis of a choice reference in accordance with the calculated cost wherein in a case where the conference can be held through a communication in the place of the conference received by the receiving a place of a conference, calculating a cost includes comparing a first time required for each extracted person to travel to another place where the conference can be held by the communication with a second time required for said each extracted person to travel to the place of the conference received by the receiving a place of a conference to calculate the cost on the basis of either the first time required or the second time required, and the extracted persons are sorted on the basis of the costs, and the costs of said each extracted person are added in order from a lowest cost to decide whether or not the added costs are within a prescribed budget for said each extracted person added, and the extracted persons are selected as the participants until the added costs exceed the prescribed budget.

* * * * *